US011470823B2

(12) United States Patent
Schwitters et al.

(10) Patent No.: US 11,470,823 B2
(45) Date of Patent: Oct. 18, 2022

(54) SHEET LOADER FOR LOADING LIVE TURKEYS AND METHODS THEREFOR

(71) Applicant: Birds Up, LLC, Spicer, MN (US)

(72) Inventors: Clint Schwitters, Spicer, MN (US); Torry Johnson, Belgrade, MN (US)

(73) Assignee: Birds Up, LLC, Spicer, MN (US)

(*) Notice: Subject to any disclaimer, the term of this patent is extended or adjusted under 35 U.S.C. 154(b) by 294 days.

(21) Appl. No.: 16/919,901

(22) Filed: Jul. 2, 2020

(65) Prior Publication Data
US 2021/0000081 A1    Jan. 7, 2021

Related U.S. Application Data

(60) Provisional application No. 62/870,548, filed on Jul. 3, 2019.

(51) Int. Cl.
| | | |
|---|---|---|
| *A01K 45/00* | (2006.01) | |
| *B65G 17/06* | (2006.01) | |
| *B65G 17/18* | (2006.01) | |
| *B65G 67/08* | (2006.01) | |
| *B65G 41/00* | (2006.01) | |

(Continued)

(52) U.S. Cl.
CPC ............ *A01K 45/00* (2013.01); *A01K 45/005* (2013.01); *B65G 17/067* (2013.01); *B65G 17/18* (2013.01); *B65G 17/42* (2013.01); *B65G 23/00* (2013.01); *B65G 23/06* (2013.01); *B65G 41/002* (2013.01); *B65G 67/08* (2013.01)

(58) Field of Classification Search
CPC ...... B65G 17/067; B65G 17/18; B65G 17/42; B65G 23/00; B65G 23/06; B65G 41/002; B65G 67/08; B65G 2201/0202; B65G 17/123; A01K 45/005; A01K 45/00
See application file for complete search history.

(56) References Cited

U.S. PATENT DOCUMENTS

| | | | |
|---|---|---|---|
| 4,074,658 A | | 2/1978 | Mermelstein |
| 5,470,194 A | * | 11/1995 | Zegers .................. B65G 67/08 414/811 |

(Continued)

FOREIGN PATENT DOCUMENTS

WO    WO-2017105819 A1 *  6/2017  ......... A22C 17/0093

OTHER PUBLICATIONS

E-Z Clean Turkey Harvester Operator's & Maintenance Manual, downloaded from www.brightcoop.com Jul. 1, 2020 publication date unknown.

*Primary Examiner* — Mark A Deuble
(74) *Attorney, Agent, or Firm* — Etherton Law Group, LLC (57) ABSTRACT

An apparatus for loading live turkeys from a barn floor to cages on a transport trailer. A continuous motorized drive chain moves attached, solid sheets that are loaded with turkeys from the barn floor into the cage, and then back to the loading position. The drive chain is looped around first and second sprockets. Each rectangular sheet is rotationally connected at two of its corners to the drive chain forming a fixed end and a loose end. When the drive chain rounds the barn end, the loose end of the sheet slides upwards on a guide flap to keep the top of the sheet facing up. The sheets are driven forward to the cages, round the end at the cage end, pulled backwards from the cages toward the barn end, and then driven forward again, all without stopping the motion of the drive chain.

10 Claims, 10 Drawing Sheets

(51) Int. Cl.
*B65G 23/06* (2006.01)
*B65G 23/00* (2006.01)
*B65G 17/42* (2006.01)

(56) References Cited

U.S. PATENT DOCUMENTS

| | | | | |
|---|---|---|---|---|
| 5,902,089 | A * | 5/1999 | Sinn | A01K 45/005 |
| | | | | 414/346 |
| 5,915,338 | A | 6/1999 | Fitzsimmons | |
| 6,109,215 | A | 8/2000 | Jerome | |
| 6,564,751 | B2 | 5/2003 | Anderson | |
| 7,281,496 | B2 * | 10/2007 | Calabria | B60P 3/04 |
| | | | | 119/845 |
| 9,055,734 | B1 * | 6/2015 | Anderson | B65G 41/002 |
| 9,301,508 | B2 * | 4/2016 | Anderson | B65G 41/003 |
| 2021/0276811 | A1 * | 9/2021 | Bacon-Maldonado, III | |
| | | | | B62D 63/062 |

* cited by examiner

SHEET LOADER FOR LOADING LIVE TURKEYS AND METHODS THEREFOR

CROSS-REFERENCE TO RELATED APPLICATIONS

This application claims the benefit of U.S. Provisional Application No. 62/870,548 filed Jul. 3, 2019, incorporated herein by reference.

FIELD OF INVENTION

This invention relates generally to an apparatus for animal husbandry. This invention relates particularly to an apparatus for loading live turkeys or other poultry from the floor of a barn to cages on a transport trailer.

BACKGROUND

To transport turkeys and other poultry in commercial quantities between barns or to slaughter, the turkeys are housed in multi-layered cages carried by a large transport vehicle such as a flatbed trailer truck. Tom turkeys are heavy, generally weighing between 25 and 40 pounds, so loading the turkeys into the cages is strenuous, time consuming and difficult—and the turkeys are generally uncooperative in the process. Loading the turkeys into the cages has historically been done in a semi-automated way, with humans funneling flocks of turkeys from the ground onto a conveyor belt that travels, in sections, to the upraised, open hinged-cage door. Additional human operators count the number of turkeys as they are shoved into the cages and the cage door is allowed to fall back down to enclose the birds in the cage. The present methods for loading are very labor-intensive, difficult and often dangerous to the person doing the loading, traumatic to the turkeys, and often results in injury or death to the birds.

The injuries and death result from a number of problems with the loading equipment and loading methods. For example, the conveyor belt is not continuous, but instead is a series of conveyor sections, separated by gaps. The birds get their legs and wings caught in the gaps, resulting in injury. The conveyor sections are of different heights, so as the belt carries the birds along they eventually drop in elevation from one height to the next. Usually there are at least three hard drops, resulting in broken legs and bruising. The belt itself is made of steel mesh, which is much more durable than canvas or other fabric belt material, but unfortunately pinches the birds' feet. And because the cage opening is about as tall as a turkey is tall, as the conveyor belt moves into the cage, the clearance between the top of the conveyor belt and the cage ceiling is reduced to significantly less than a bird is tall. This results in birds being decapitated as they are thrown into the cage by the momentum of the conveyor belt though the cage opening that is too small. It is common to have dozens or hundreds of birds per trailer die during the loading process.

It would be desirable to treat birds in a more humane way while loading, which would result in fewer injuries and deaths and reduce the stress on the birds. It would also be desirable to reduce the human labor involved.

SUMMARY OF THE INVENTION

This invention is an apparatus for loading live turkeys or other poultry from the floor of a barn to cages on a transport trailer. The apparatus uses a continuous motorized drive chain to smoothly move attached, solid sheets that are loaded with turkeys from the barn floor into the cage, and then retract the sheets back to the loading position. Each rectangular sheet is connected at two of its corners to the drive chain so that each sheet moves with the drive chain. The sheet is connected to the drive chain at only at one end with the other end loose. This configuration enables the sheets to be driven forward by the drive chain to the cages, to round the end at the cage end, be pulled backwards in retreat from the cages toward the barn end, and then driven forward again by the drive chain, all without stopping the motion of the drive chain.

In one embodiment the sheet loader has a continuous drive chain looped around a first sprocket at the end where the turkeys are loaded and looped around a second sprocket at the end where the turkeys transfer to the cages. One or more rectangular sheets each is rotationally connected to the drive chain to form a fixed end and the other end of the sheet is not connected to the drive chain, leaving it loose. When the drive chain rounds the barn end, the loose end of the sheet slides on a guide flap to keep the top of the sheet facing upwards.

DETAILED DESCRIPTION OF THE INVENTION

Figure 1:
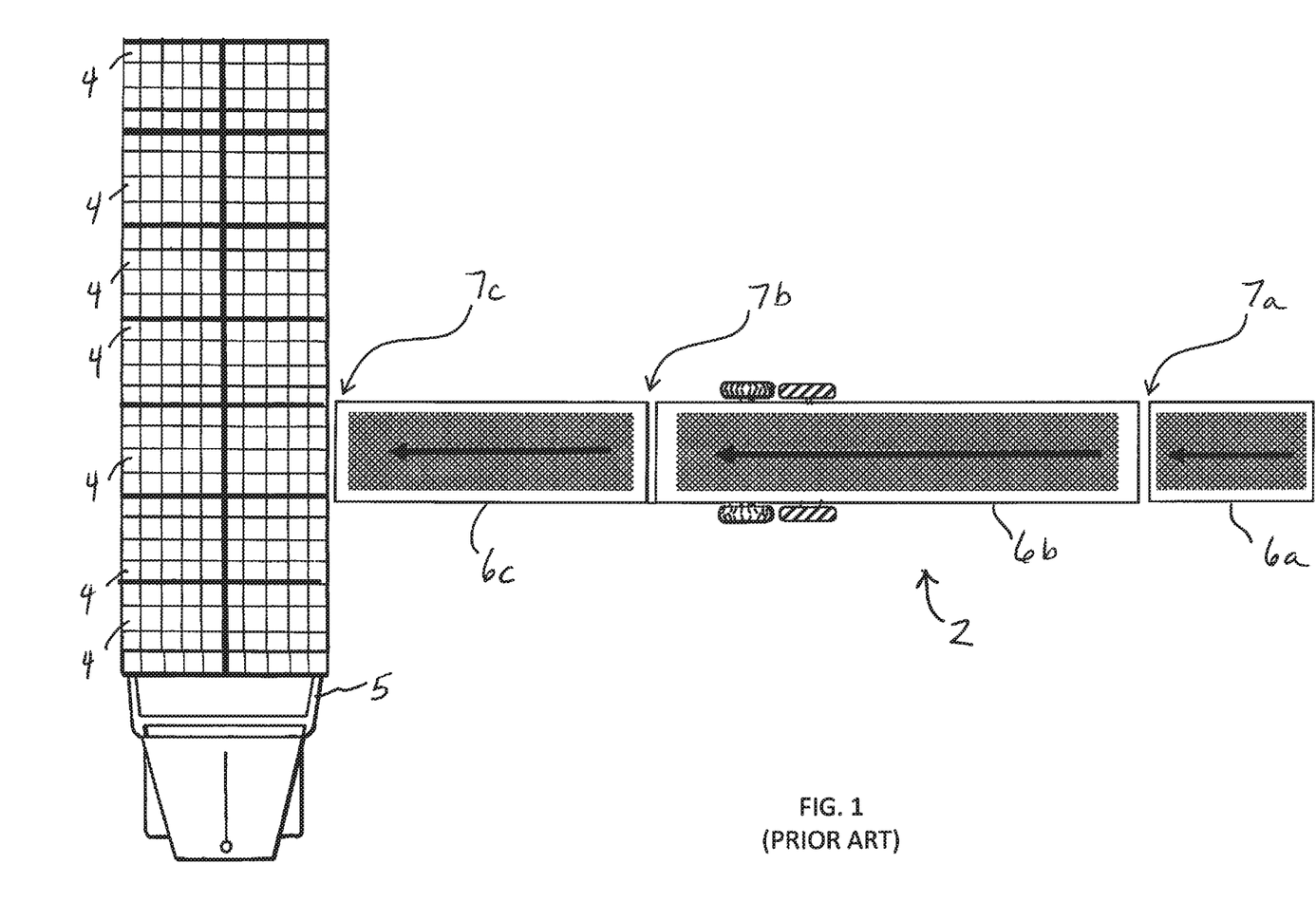
FIG. 1 is a top view of truck and loader (prior art).
Figure 2:
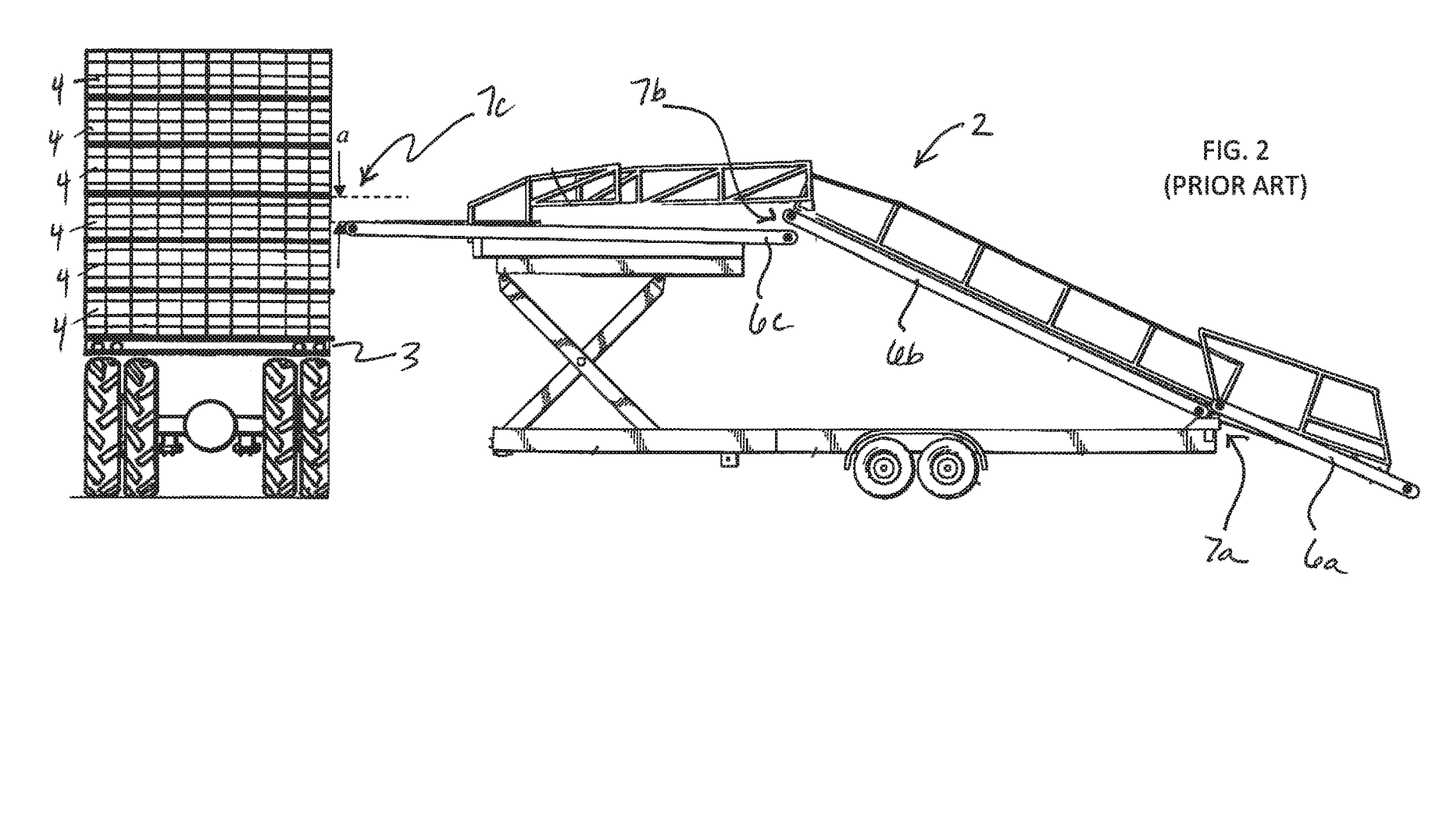
FIG. 2 is an end view of truck and loader (prior art) with a side view of a prior art conveyor-belt type loader.

The improvements made to turkey loading apparatus by the present invention are more easily described by first understanding the problems of the prior art. FIGS. 1 and 2 show a simplified top view and end view, respectively, of a prior art conveyor-belt type turkey loader 2 aligned to load turkeys onto a flatbed trailer 3 holding many stacked coops or cages 4, pulled by a tractor truck 5. The loader 2 is comprised of three conveyor belt sections 6a, 6b, and 6c. Gap 7a is formed between section 6a and 6b, gap 7b is formed between section 6b and 6c, and gap 7c is formed between section 6c and the trailer 3. The angles of the sections 6a, 6b, and 6c change depending on the height of the cage to be loaded, which changes the sizes of the gaps 7a and 7b. The turkeys are dropped from high to low at each gap 7a-7c. In many cases humans stand at the junction of section 6c and the trailer 3 to force the turkeys into the cages.

Figure 3:
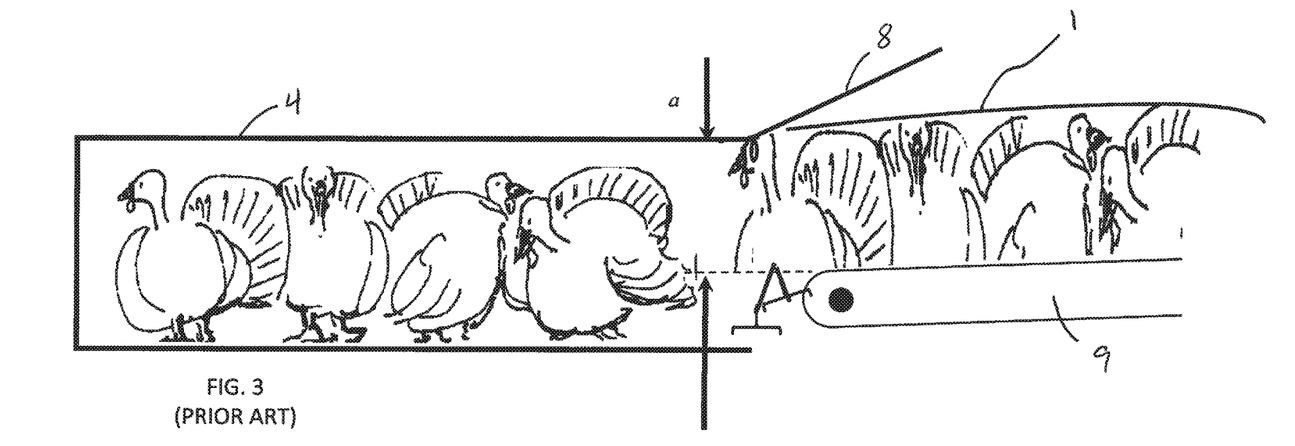
FIG. 3 is a cutaway side view of the prior art conveyor-type belt loader with the conveyor belt extended into a cage.

FIG. 3 shows a cutaway side view of a cage 4 being loaded by a conveyor belt 9 of the prior art. FIG. 3 shows that the effective size of the opening, a, that the turkeys are forced through into the cage 4 is smaller than the turkeys are tall. Typically the height of a cage is about 16" with the cage door 8 open, but the opening a is reduced by the thickness of the conveyor belt 9, which is about 4", leaving the effective opening a about 12" high. In some loaders, a lid 1 is used to force the turkeys to flatten against the belt. That lid further reduces the opening by about 1"-2", leaving the effective opening a about 10" high. Given that tom turkeys are 14"-24" tall, and when they sit are at least 12" tall, this narrow opening causes many turkeys to hit their heads on the ceiling of the cage 4, and also slows down the process of forcing the turkeys into the cage.

Figure 4:
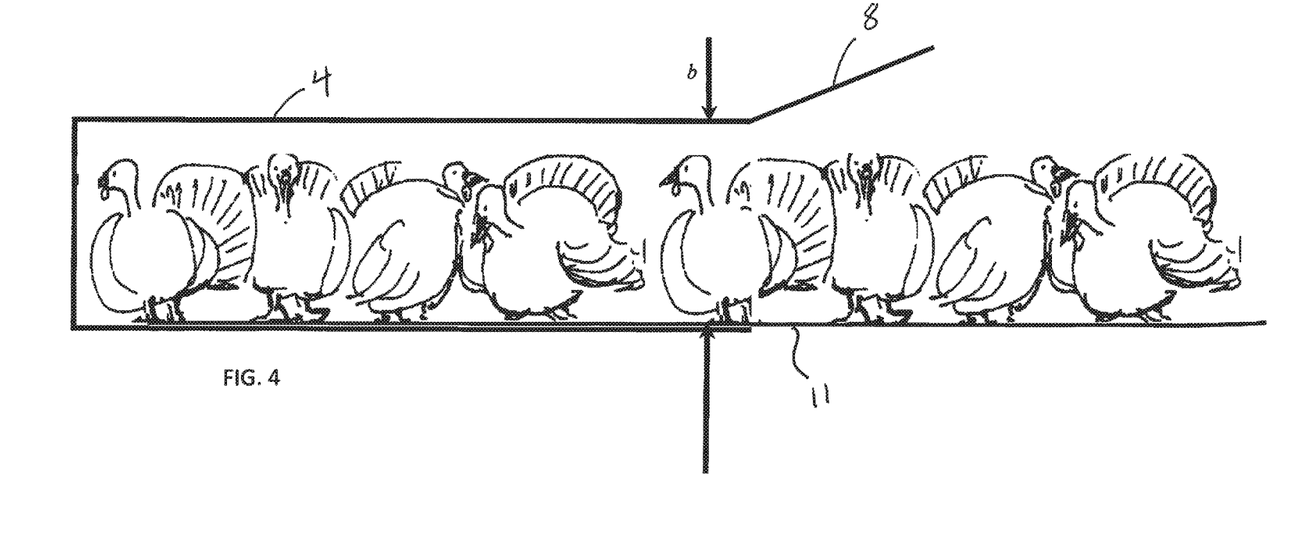
FIG. 4 is a cutaway side view of present sheet loader with a sheet extended into a cage.

FIGS. 4-13 show the present invention. FIG. 4 shows a cutaway side view of a cage 4 being loaded by the present device 10. FIG. 4 shows that the effective size of the opening, b, that the turkeys are forced through into the cage 4 is much larger than that of the prior art opening a. With the present invention, the typical height of about 16" is reduced only by about ½", the thickness of a sheet 11. Thus the cage opening is about 15½" compared to the prior art effective opening of about 12". This larger opening prevents turkeys from hitting their heads on the ceiling of the cage 4, and therefore reduces injury and speeds up the process of loading the turkeys into the cage.

Figure 5:
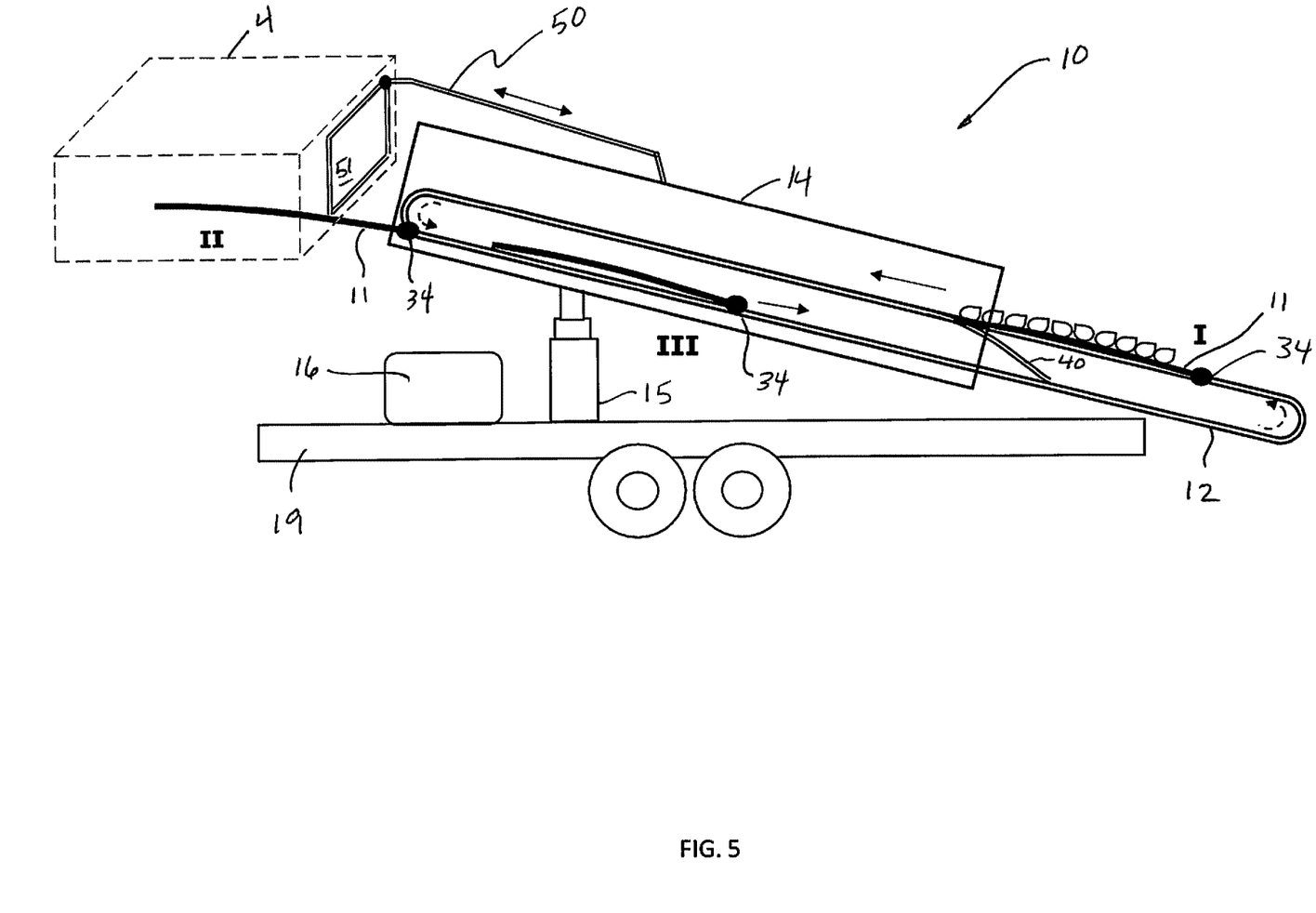
FIG. 5 is a cutaway side view schematically illustrating the sheet loader having three sheets.
Figure 6:
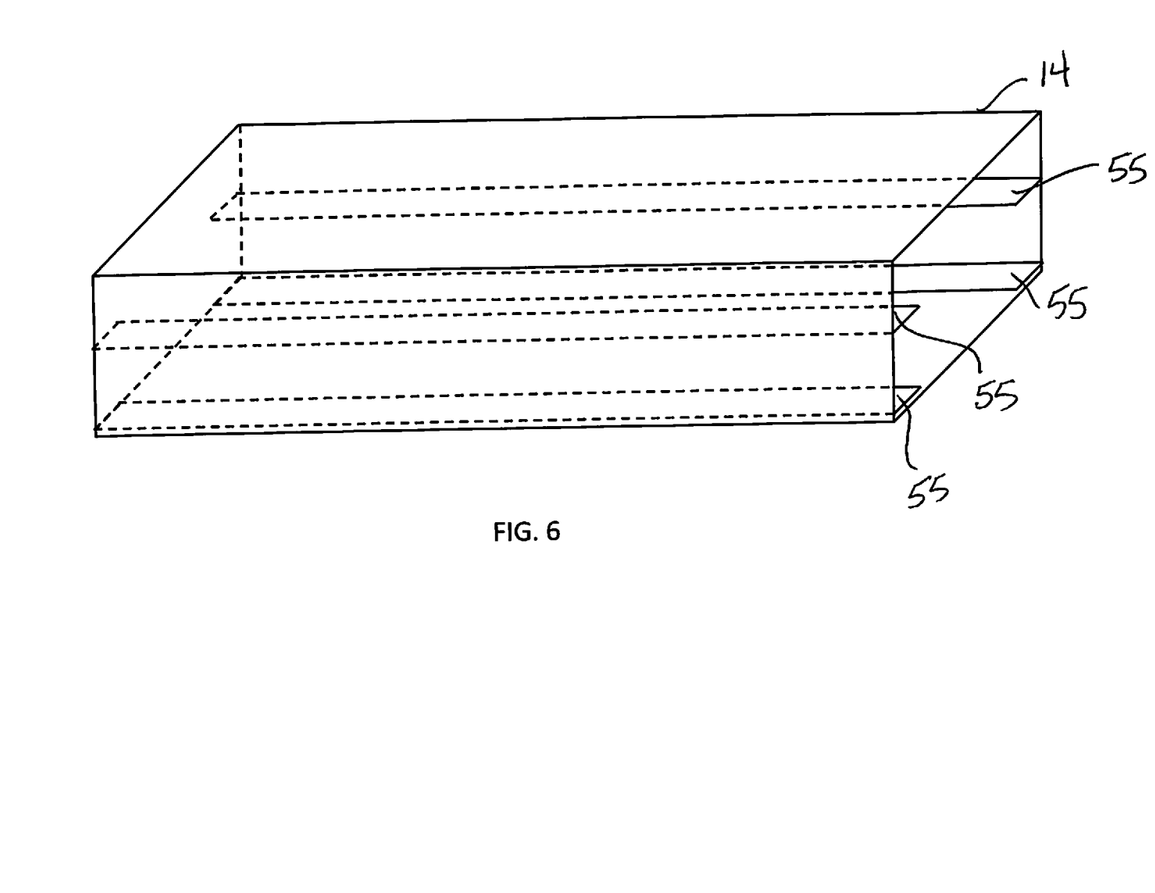
FIG. 6 is a perspective view of part of the frame showing the rails.

FIG. 5 shows a simplified side view of the sheet loader 10, which is used to load turkeys 17 or other poultry onto a cage 4 of the prior art on a flatbed trailer (not shown), which may be pulled by a tractor truck (not shown). The sheet loader 10 is on a wheeled platform 19 that can be easily towed by a truck (not shown) to a desired location.

On the platform 19 sits a frame 14, which surrounds and supports much of the length of the conveying surface, as described in detail below. The frame 14 is a box having four walls, but is open at both ends, forming a tunnel through which the turkeys are conveyed to the cages. The box may have straight or arched sides, top or bottom. The open ends may be closed off with a rear flap 57 or a pusher bar. In lieu of a single box, the frame may be made as a 3-sided square-U shaped trough with a separate lid. Rails 55 run on the inside of the box to support moving sheets 11, as described below. See FIG. 6. The walls of the frame 14 are typically made of spaced-apart bars of hollow square steel pipe, which keep the turkeys in the frame 14 but permit the operators to see the birds while being conveyed through the frame 14. The frame is about the same width and height as a cage 4. The frame 14 is raised and lowered to the desired height by a lifting mechanism, preferably a scissor lift 16 or piston 15, using electrical, mechanical hydraulic or pneumatic force. By placing the piston near the cage end of the frame, the frame can be tilted at an angle to reach the highest cage of the trailer or lowered to be horizontal with the ground. Atop the frame is a holder 50 which can slide forward toward the cage and backward away from the cage. The holder 50 has a hinged door 51 that is held open in a position substantially horizontal and parallel to the frame until the holder is moved far enough forward toward the cage that the door 51 is no longer supported and then swings down into a substantially vertical position, parallel to the door of the cage, to prevent the turkeys from getting out of the cage. Optionally the frame may also utilize a pusher bar or vertical plate at the cage end that is used to corral the turkeys in the frame and push the turkeys from the sheet into the cage.

Figure 12A:
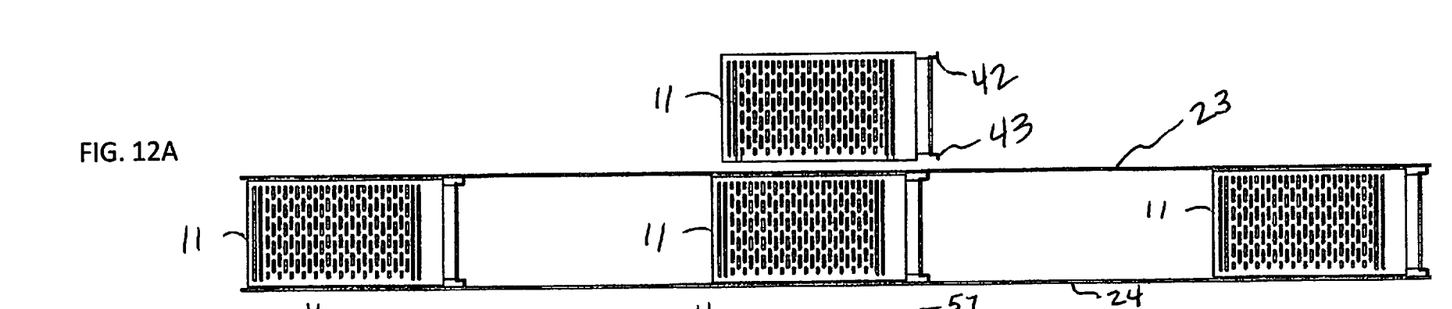
FIG. 12A is a top view of four sheets of the invention shown in FIG. 12C.
Figures 12B, 12C:
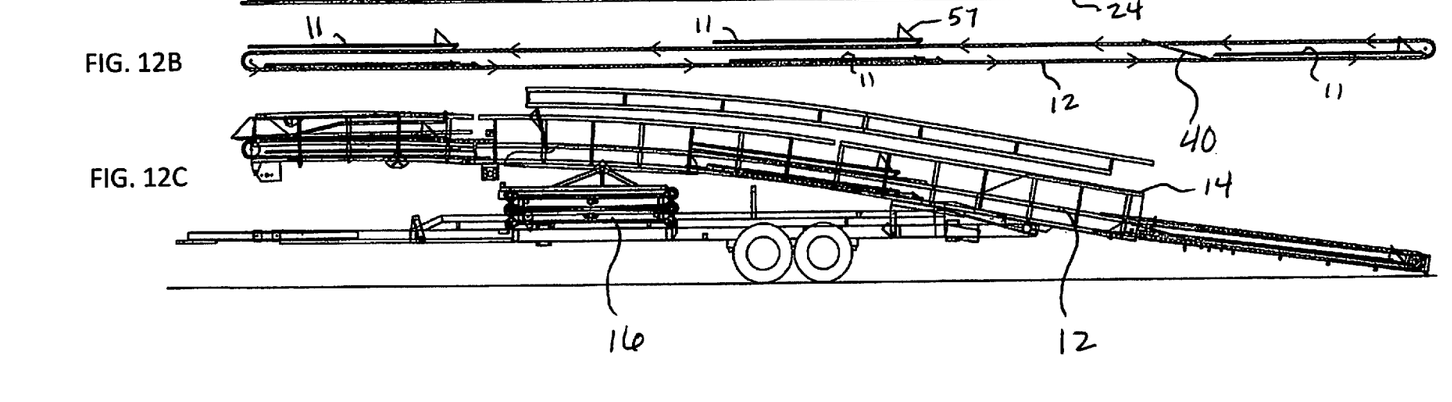
FIG. 12B is a side view of four sheets on the drive chain of the invention shown in FIG. 12C.
FIG. 12C is a side view of another embodiment of the invention.

The frame 14 encloses much of the length of a drive chain 12, with the forward end of the drive chain being near the cages and the rear end of the drive chain 12 extending out the open end of the frame 14 where the birds are loaded onto the sheets from the barn floor. See FIGS. 5 and 12. The drive chain is a looped around two sprockets, at least one of which is a drive sprocket connected to a drive motor. The drive chain 12 is a preferably a pair of parallel endless roller chains 23, 24 that move in tandem around pairs of sprockets 25, 26. Preferably the drive sprocket is near the cage end of the drive chain and the barn-end sprocket is an idler gear. Optionally additional sprockets may be added along the drive chain. In some cases a single endless chain may suffice as the drive chain. In the preferred embodiment, there is no belt or other material between the parallel endless roller chains and instead only space, so that the direction of movement of the sheets 11 may switch from retraction to forward movement, as explained below.

Figure 7:
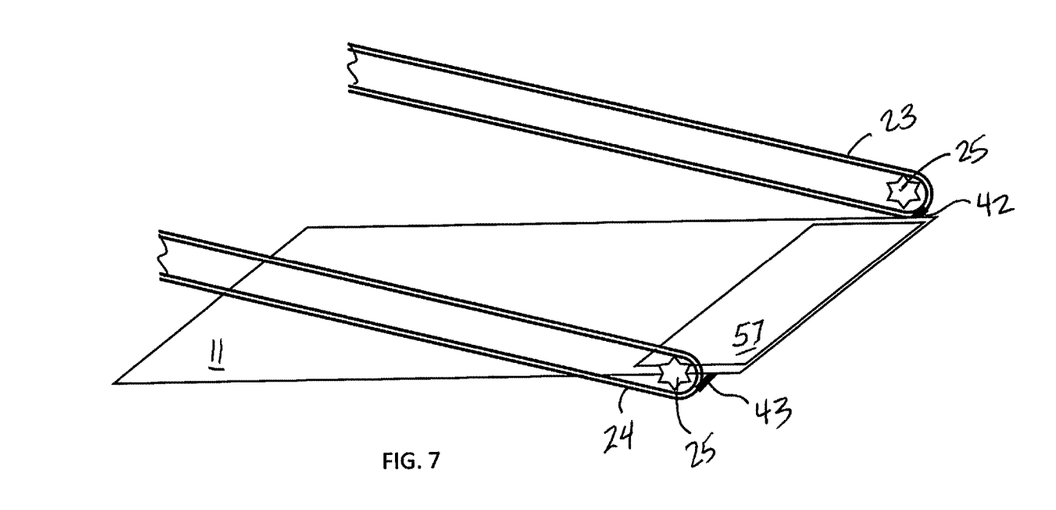
FIG. 7 is a perspective view of an empty sheet at the barn end.
Figure 8:
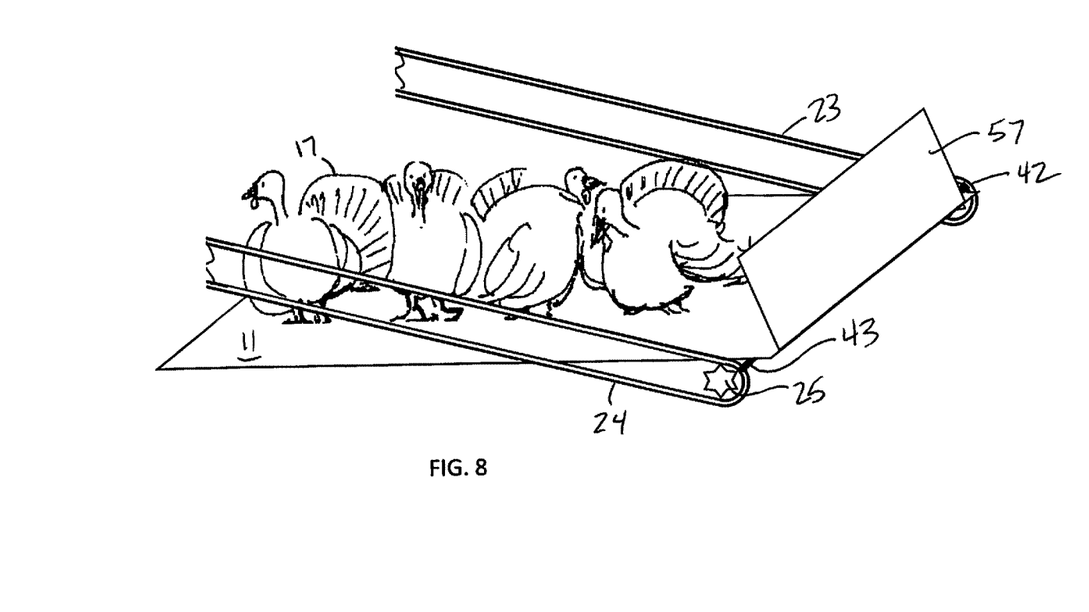
FIG. 8 is a perspective view of a loaded sheet at the barn end.
Figure 9:
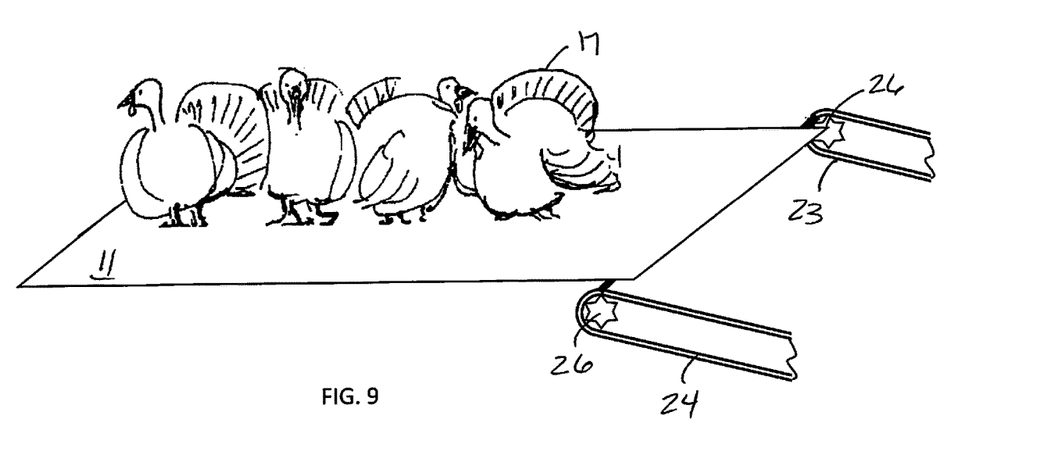
FIG. 9 is a perspective view of a loaded sheet at the cage end before it is retracted from the cage.

One or more sheets 11 is connected to the drive chain 12 so that each sheet 11 moves with the drive chain 12. Each sheet 11 is rectangular and therefore has four corners, and is typically about 4 ft×8 ft. See FIGS. 7-9. Two of the corners are attached, directly or indirectly, to the drive chain 12 at connection point 34. These corners are referred to herein as fixed corners. The attachment permits the fixed corners of the sheets to move rotationally relative to the drive chain to keep the top of the sheet facing generally upwards as it moves around the guide chain path. The relative motion may be a rotational motion, a pivot motion, or other motion and the nature of the attachment is generally referred to herein as rotationally attached. In some cases the fixed corners are each attached to the parallel endless roller chains 23, 24 with short arms 42, 43 respectively. The fixed end may be attached to the drive chain with other mechanisms such as a slide bolt that fits into a pocket on the sheet and chain, a universal joint, or a ball-and socket pairing. The edge of the sheet 11 between the fixed corners is referred to herein as the fixed end of the sheet. The other two corners of the sheet are not fixed to the drive chain and are referred to herein as the loose corners. The edge of the sheet 11 between the loose corners is referred to herein as the loose end 31 of the sheet. The loose end 31 of the sheet 11 is loose, that is, not fastened to the drive chain 12. Optionally each sheet is equipped with a rear flap 57 to help keep the turkeys on the sheet once they are loaded. The rear flap 57 is hinged to enable movement from a stowage position substantially parallel to the sheet, as shown in FIG. 7, and then moved to and temporarily fixed in a substantially vertical position, as shown in FIG. 8.

Figure 10:
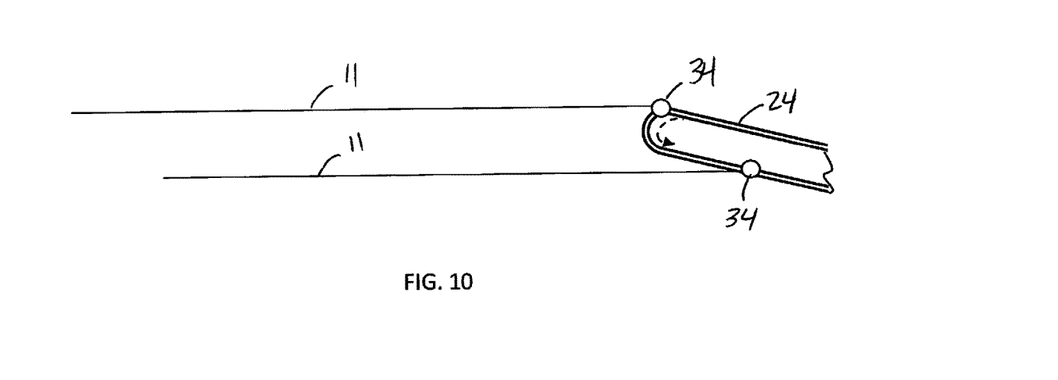
FIG. 10 is a side view illustrating a sheet rounding the cage end of the drive chain.
Figure 11:
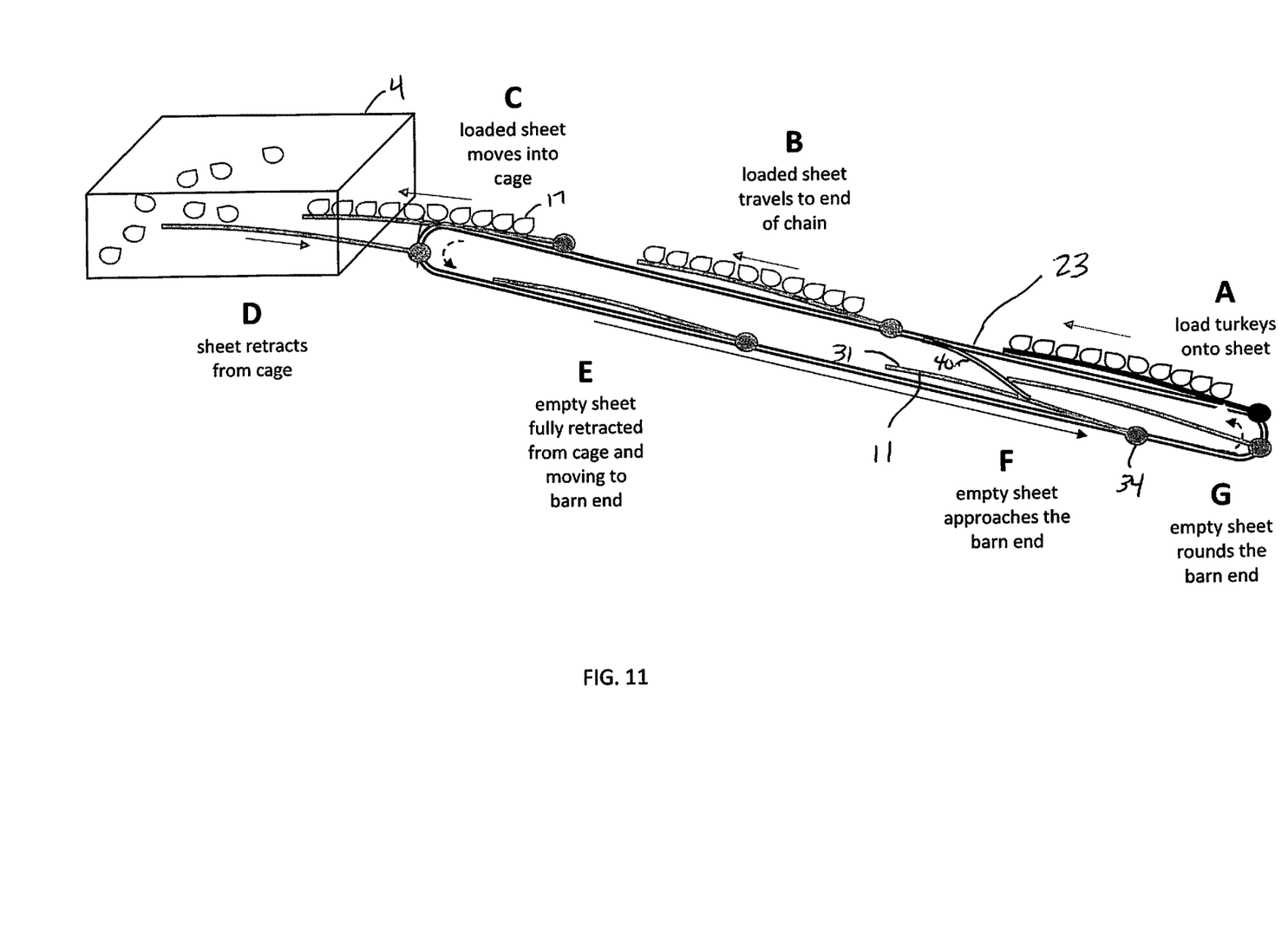
FIG. 11 is a cutaway side view schematically illustrating the drive chain moving a single sheet.

This configuration in which the sheet is attached to the drive chain at a fixed end but not at its loose end enables the sheets 11 to be driven forward toward the cages 4 by the drive chain 12 and, without stopping the motion of the drive chain 12, to round the ends of the drive. FIG. 10 shows a sheet 11 rounding the cage end of the drive chain 12 and FIG. 11 shows a sheet 11 rounding the barn end of the drive chain 12. The drive chain 12 smoothly moves attached sheets 11 that are loaded with turkeys from the ground or barn floor 13 into the cage 4, and then retracts the empty sheets 11 after the turkeys are unloaded into the cage 4.

When a sheet is moving forward toward the cage, it is pushed from behind at its fixed corners that are attached to the drive chain. Once it rounds the bend near the cages, the drive chain pulls the sheet rearward at its fixed corners, away from the cages. In order to change direction from moving away from the cages to forward motion, the sheet is dragged around rear sprocket and at some point the fixed end of the sheet is slightly higher than the loose end of the sheet. To help the sheets smoothly round the barn end, a guide flap 40 sits between the pair of chains 23, 24 within the frame 14. The guide flap 40 is attached to the frame at its top end and the lower end dangles free. As the retracting sheet approaches the barn end, the sheet slides under the lower end of the guide flap. Eventually the loose end of the sheet passes under the lower end of the guide flap and the sheet starts to round the barn end. As the loose end of the sheet 11 rounds the barn end, the sheet changes direction, moving from motion toward the bard to motion away from the barn. As it changes direction, the loose end of the sheet abuts the lower end of the guide sheet and begins to slide upwards on it, such that the top of the sheet remains facing upwards. That is, the guide flap 40 catches the loose end 31 of the sheet 11 and forcibly assists the loose end of the sheet 11 up so that it can be pushed forward toward the cage. The guide flap 40 thus assists the sheets to change direction from moving away from the cages to moving toward the cages.

FIG. 10 illustrates the process using a single sheet only. For clarity, the frame is not shown in FIG. 10 and the turkeys are not to scale. At position A, a desired number of turkeys have been loaded onto the sheet 11 by humans or pre-loader conveyor. The sheet 11 is driven forward toward the cage 4 by the drive chain 12. Position B shows the loaded sheet 11 part way on its travels to the cage. Position C shows the sheet 11 as it enters the cage 4 and is still moving toward the cage 4. Once the sheet 11 is in the cage 4 as far as the drive chain can take it, the holder 50 or pusher bar (not shown) moves forward and blocks the open side of the cage so that the turkeys cannot escape the cage. The pusher bar may be engaged to push stubborn turkeys off the sheet. Once the holder door 51 is in place or cage door closed, the sheet 11 is retracted from the cage, as shown at Position D, as the drive chain 12 continues to turn, and the turkeys are left standing in the cage on the cage floor. Position E shows the empty sheet 11 retracted fully from the cage 4. At Position F, the empty sheet 11 slides under the guide flap. At Position G the sheet reaches the barn end of the drive chain 12 and rounds the bend to return to Position A to be reloaded.

Figure 13:
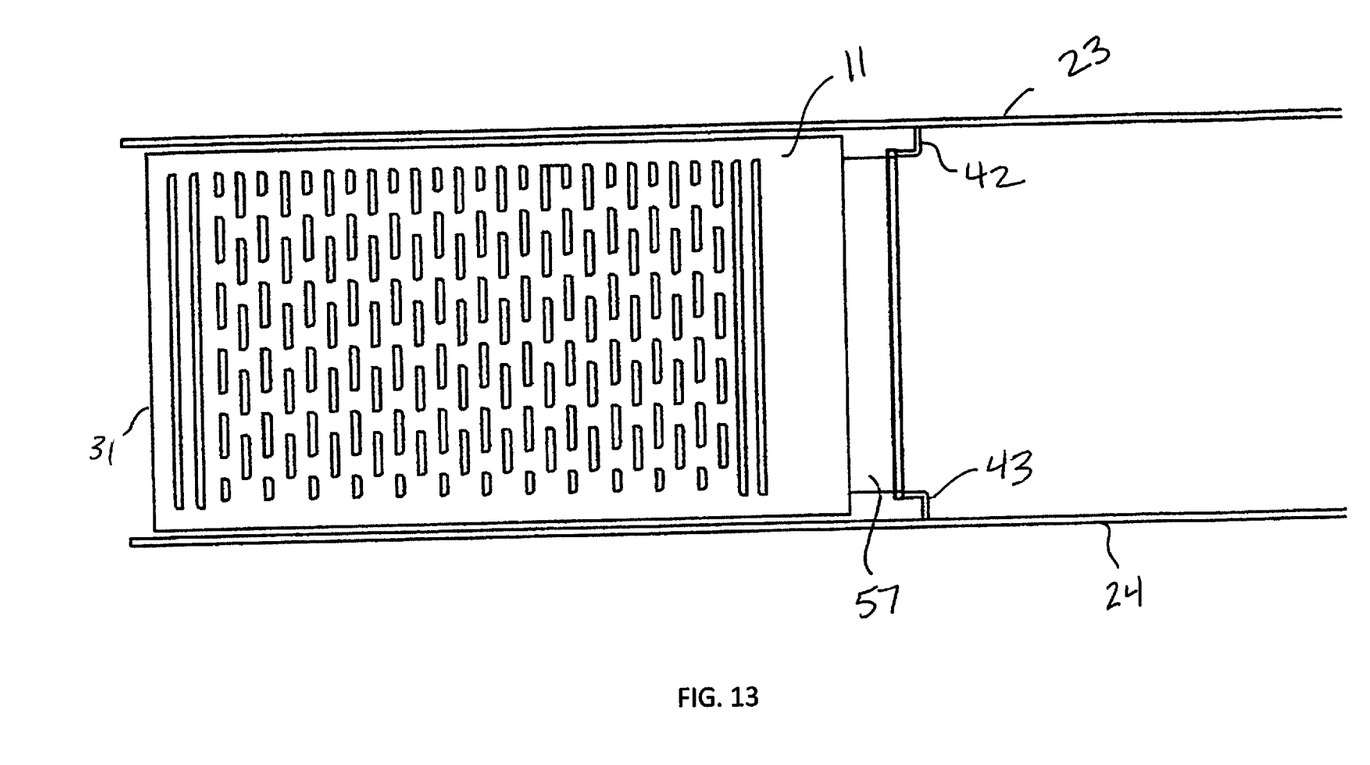
FIG. 13 is a top view of a sheet connected to the drive chain.

The sheets 11 are preferably a substantially continuous solid, as opposed to made of discrete parts such as rollers, wheels, skates, metal mesh, or metal chains which pinch the turkeys' feet. The solid surface enables the enables the turkeys 17 to sit or stand on the sheet without pinching or cutting their feet. The solid sheet may have holes that permit the sheets to be more easily cleaned, as well as texture on at least the top of the sheet to help the birds stand steadily. FIG. 13 shows a solid sheet of ½" thick plastic textured with shallow oval cutouts. Each sheet may be rigid or flexible, but the sheet must be rigid enough that when the sheet is being extended over the gap between the frame 14 and the cage 4 while the sheet 11 is loaded with turkeys, the sheet does not bend so much that the turkeys slide off the sheet. In one embodiment, each sheet is ½" thick plastic, which is flexible but rigid enough to support the weight of the turkeys as the sheet is cantilevered out past the frame 14 into the cage 4. Preferably the sheet is made of plastic, which is durable and can be easily cleaned, but metal, wood or other material may suffice.

One or more sheets 11 may be attached to the drive chain and in a preferred embodiment, three sheets 11 are connected to the drive chain and move with it. Using more than one sheet enables a continuous process in which one sheet to discharge turkeys into the cage while another sheet is being loaded at the barn end. FIG. 5 shows three mobile sheets, labeled I, II, and III attached to the drive chain 12.

As the fixed end rounds the bend at the rear of the drive chain, the leading edge of the guide flap flops down to the bottom of the frame so that its loose end is stationed below the loose end of the moving sheet. The loose end of the moving sheet is pulled past the flopped end of the guide flap then forced on top of it. The loose end of the moving sheet slides along the guide flap.

In general the method for loading live turkeys into a cage on a trailer from a barn floor involves herding turkeys from the barn floor onto a rectangular sheet having a fixed end and a loose end, wherein the fixed end is connected to a continuous drive chain having a cage end and a barn end. An optional rear flap is flipped up on the sheet to help keep the turkeys from sliding off the sheet backwards. The motor causes the drive sprocket to move the drive chain continuously as the loaded sheet travels up the frame and the loose end of the sheet is extended into the cage. The turkeys are prevented from falling out backwards from the cage, either with the rear flap, holder and the door, or with a pusher bar. The continuing motion of the drive chain retracts the now-unloaded sheet from the cage and pulls it around until the fixed end of the sheet is at the barn end of the drive chain in the loading position. The guide flap dangles above the retracting sheet and not only helps to guide the loose end as the fixed end moves around the sprocket at the barn end, but also helps keep turkeys from moving too far forward on the sheet when they are loaded. Here, the process starts again as turkeys are herded on to the sheet.

In the preferred embodiment, the drive chain motion is continuous and does not stop until a given cage is full and the frame needs to be relocated to the next cage. In a preferred embodiment, the sheet loader 10 is powered by a fuel-powered engine 16 that also sits on the platform 19. Alternatively, the sheet loader 10 may be powered by the tractor truck 5 or a separate generator.

Another advantage of the sheet loader 10 is that in addition to being able to count the turkeys 17 as they are loaded into a cage, a loaded sheet 11 can be weighed at any point along the path.

While there has been illustrated and described what is at present considered to be the preferred embodiment of the present invention, it will be understood by those skilled in the art that various changes and modifications may be made and equivalents may be substituted for elements thereof without departing from the true scope of the claims.

The invention claimed is:

1. A sheet loader for loading live turkeys from a barn floor into a cage on a trailer, the loader comprising:
   a. a continuous drive chain looped around a first sprocket at a cage end of the drive chain and a second sprocket at a barn end of the drive chain; and
   b. one or more rectangular sheets each having a loose end opposite a fixed end, wherein the fixed end is rotationally connected to the drive chain;
       such that the drive chain drives each sheet in a continuous loop from the barn floor to the cage.

2. The sheet loader of claim 1 wherein the drive chain is a pair of endless chains and:
   a. the first endless chain is looped around the first sprocket at the cage end of the drive chain and the second sprocket at the barn end of the drive chain; and b. the second endless chain is looped around a third sprocket at the cage end of the drive chain and a fourth sprocket at the barn end of the drive chain.

3. The sheet loader of claim 1 further comprising a guide flap upon which the loose end slides when the drive chain rounds the barn end.

4. The sheet loader of claim 1 further comprising a motor to drive the first or second sprocket.

5. The sheet loader of claim 1 wherein the fixed end of the sheet is connected to the drive chain with a first arm at a first corner of the sheet and a second arm at a second corner of the sheet.

6. The sheet loader of claim 1 wherein the sheet is solid.

7. A sheet loader for loading live turkeys into a cage on a trailer from a barn floor, the loader comprising:
   a. a frame surrounding a portion of a drive chain, the drive chain comprising a first endless roller chain parallel to a second endless roller chain;
   b. a first sprocket around which the first endless roller chain is looped at a cage end of the drive chain;
   c. a second sprocket around which the first endless roller chain is looped at a barn end of the drive chain;
   d. a third sprocket around which the second endless roller chain is looped at the cage end of the drive chain;
   e. a fourth sprocket around which the second endless roller chain is looped at the barn end of the drive chain;
   f. a motor to drive one or more of the first, second, third or fourth sprockets;
   g. a lifting mechanism connected to the frame to raise and lower the cage end of the frame;
   h. one or more rectangular sheets wherein:
      i. each sheet has a top and a bottom; and
      ii. each sheet has a loose end and a fixed end, wherein the fixed end is rotationally connected to the drive chain; and
   i. a guide flap upon which the loose end slides when the drive chain rounds the barn end such that the top of the sheet remains facing upwards.

8. The sheet loader of claim 7 further comprising a wheeled platform upon which the frame rests.

9. A method for loading live turkeys into a cage on a trailer from a barn floor, the method comprising:
   a. herding turkeys onto a rectangular sheet having a fixed end and a loose end, wherein the fixed end is connected to a continuous drive chain having a cage end and a barn end;
   b. moving the drive chain to move the loaded sheet into a cage;
   c. restraining the turkeys in the cage; and
   d. moving the drive chain to retract the sheet from the cage.

10. The method of claim 9 further comprising:
   a. moving the drive chain until the fixed end of the sheet is at the barn end of the drive chain;
   b. dangling a guide flap near the loose end of the sheet;
   c. moving the drive chain until the loose end of the sheet contacts the guide flap.

\* \* \* \* \*